US009775171B2

(12) United States Patent
Kwon et al.

(10) Patent No.: US 9,775,171 B2
(45) Date of Patent: Sep. 26, 2017

(54) SYSTEM AND METHOD FOR SPEED FRAME EXCHANGE

(71) Applicant: Futurewei Technologies, Inc., Plano, TX (US)

(72) Inventors: Younghoon Kwon, San Diego, CA (US); Zhigang Rong, San Diego, CA (US); Yunsong Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 320 days.

(21) Appl. No.: 14/541,743

(22) Filed: Nov. 14, 2014

(65) Prior Publication Data
US 2015/0172025 A1 Jun. 18, 2015

Related U.S. Application Data

(60) Provisional application No. 61/917,738, filed on Dec. 18, 2013.

(51) Int. Cl.
| *H04L 5/00* | (2006.01) |
| *H04W 74/00* | (2009.01) |
| *H04W 28/06* | (2009.01) |
| *H04W 76/00* | (2009.01) |
| *H04W 52/02* | (2009.01) |
| *H04L 1/16* | (2006.01) |
| *H04W 84/12* | (2009.01) |

(52) U.S. Cl.
CPC ......... *H04W 74/002* (2013.01); *H04W 28/06* (2013.01); *H04W 52/0216* (2013.01); *H04W 76/00* (2013.01); *H04L 1/1635* (2013.01); *H04L 5/0055* (2013.01); *H04W 74/004* (2013.01);

(Continued)

(58) Field of Classification Search
CPC H04W 74/002; H04W 28/06; H04W 52/0216
See application file for complete search history.

(56) References Cited

U.S. PATENT DOCUMENTS

2005/0185628 A1* 8/2005 Watanabe ........... H04W 56/002
370/347
2008/0112351 A1* 5/2008 Surineni ........... H04W 74/0816
370/312

(Continued)

FOREIGN PATENT DOCUMENTS

CN 102595623 A 7/2012
CN 102694633 A 9/2012

(Continued)

OTHER PUBLICATIONS

Asterjadhi,A. "IEEE P802.11 Wireless LANs, Comment Resolution for Miscellaneous," IEEE 802.11-13/1022rl, Sep. 2013 (Aug. 1, 2013), 8 pgs.

(Continued)

*Primary Examiner* — Wei Zhao
(74) *Attorney, Agent, or Firm* — Slater Matsil, LLP

(57) ABSTRACT

In one embodiment, a method includes receiving, at a first time, by a first user equipment (UE) from a first device, a request to send (RTS) frame including a first duration and receiving, at a second time, by the first UE from a second device, a clear to send (CTS) frame including a second duration. The method also includes determining a duration of a speed frame exchange (SF) exchange in accordance with the first duration and the second duration.

21 Claims, 13 Drawing Sheets

(52) U.S. Cl.
CPC .......... *H04W 74/006* (2013.01); *H04W 84/12* (2013.01); *Y02B 60/50* (2013.01)

(56) References Cited

U.S. PATENT DOCUMENTS

| | | | |
|---|---|---|---|
| 2010/0316150 A1* | 12/2010 | Amini | H04W 74/02 375/260 |
| 2012/0099664 A1 | 4/2012 | Cheong et al. | |
| 2012/0243485 A1 | 9/2012 | Merlin et al. | |
| 2013/0272137 A1 | 10/2013 | Kwon et al. | |
| 2013/0301569 A1* | 11/2013 | Wang | H04L 5/0055 370/329 |

FOREIGN PATENT DOCUMENTS

| | | |
|---|---|---|
| CN | 102905309 A | 1/2013 |
| EP | 2620017 A1 | 7/2013 |
| WO | 2012040495 A1 | 3/2012 |
| WO | 2015031046 A1 | 3/2015 |

OTHER PUBLICATIONS

Fischer, M. et al., "Joint Proposal MAC Detail," IEEE 802.11-05/1165r3, Jan. 16, 2006, 76 pgs.

V, K. et al., "PS-Poll TXOP Using RTS/CTS Protection," IEEE 802.11-12/1310rl, Nov. 9, 2012, 15 pgs.

International Search Report and Written Opinion, International Application No. PCT/CN2014/093674, Huawei Technologies Co., Ltd., Date of mailing Mar. 20, 2015, 11 pages.

Wong, E. et al., "Speed Frame Exchange," IEEE 802.11-12/0834r0, Jul. 16, 2012, 17 pgs.

Zheng, S. et al., "Speed Frame Exchange Using NDP Frames," IEEE 802.11-13/0519r0, May 11, 2013, 18 pgs.

* cited by examiner

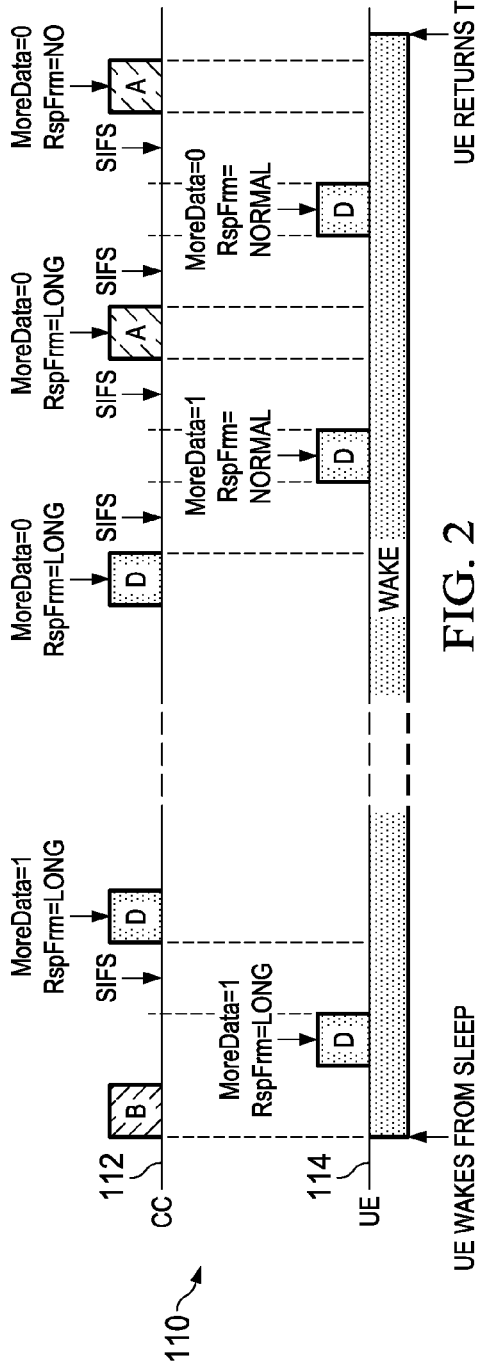
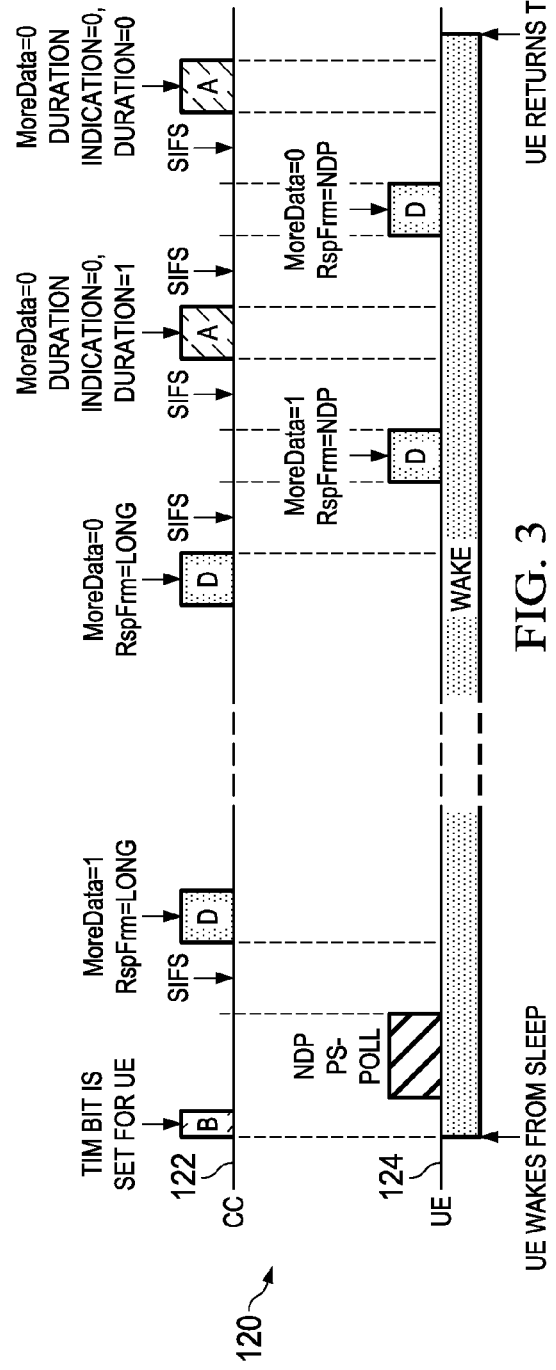

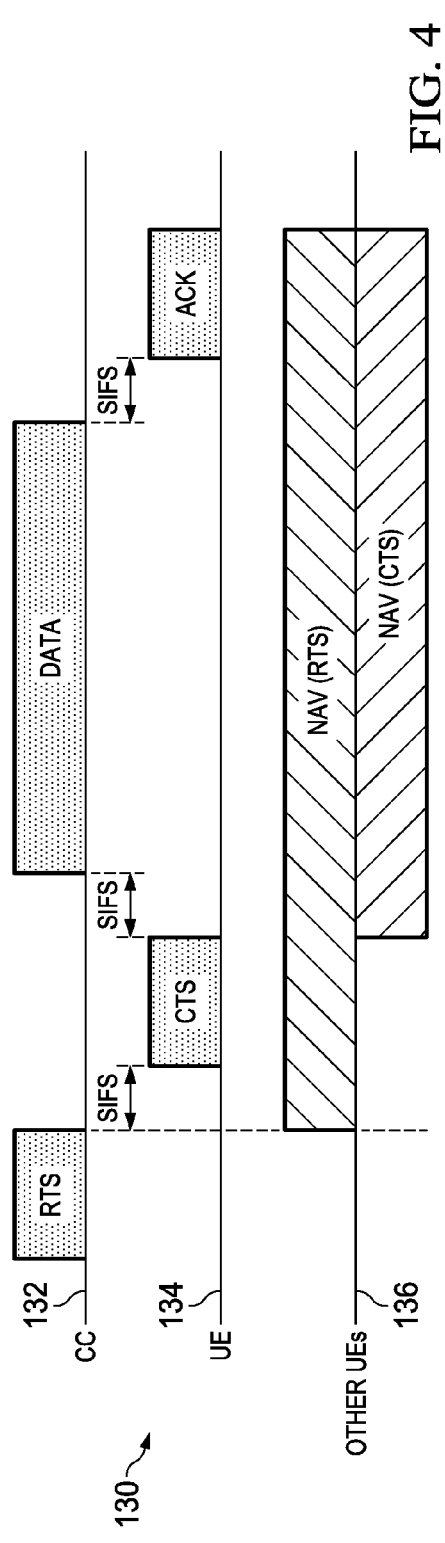
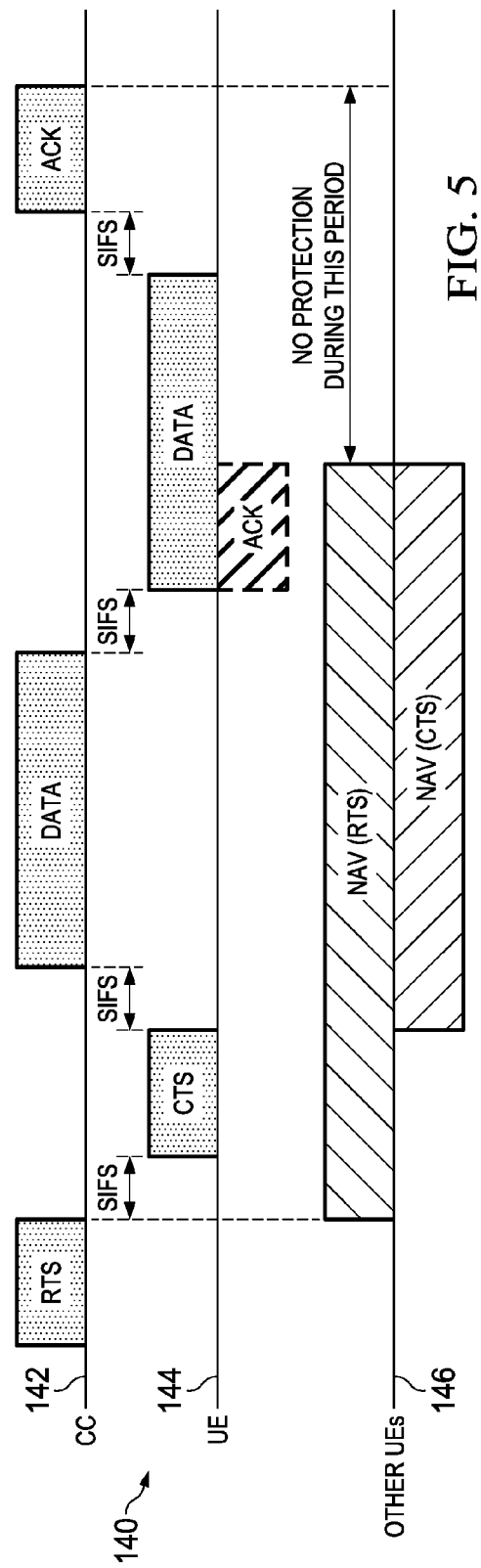

SYSTEM AND METHOD FOR SPEED FRAME EXCHANGE

This application claims the benefit of U.S. Provisional Application Ser. No. 61/917,738 filed on Dec. 18, 2013, and entitled "Speed Frame Exchange Protection Method and System," which application is hereby incorporated herein by reference.

TECHNICAL FIELD

The present invention relates to a system and method for wireless communications, and, in particular, to a system and method for speed frame exchange.

BACKGROUND

Speed frame (SF) exchange is a method of exchanging a sequence of uplink and downlink Physical layer Protocol Data Units (PPDUs) in a transmission opportunity (TXOP) between a communications controller and a user equipment (UE). In an SF exchange, a communications controller and a UE exchange a sequence of uplink and downlink PPDUs separated by a short interframe space (SIFS) time. Both uplink and downlink channel accesses are combined in a continuous frame exchange sequence between a pair of devices. UEs participating in the SF exchange use information presented in the frame control field, the physical layer convergence procedure (PLCP) header signal field, and Null Data Packet (NDP) medium access control (MAC) frames to signal an SF exchange. This reduces the number of contention based channel accesses, improves channel efficiency by reducing the number of frame exchanges, and reduces the amount of handshaking. Also, the UE power consumption is reduced by reducing the awake time.

SUMMARY

An embodiment method includes receiving, at a first time, by a first user equipment (UE) from a first device, a request to send (RTS) frame including a first duration and receiving, at a second time, by the first UE from a second device, a clear to send (CTS) frame including a second duration. The method also includes determining a duration of a speed frame exchange (SF) exchange in accordance with the first duration and the second duration.

An embodiment method includes transmitting, at a first time, by a first device to a second device, a request to send (RTS) frame including a first duration and receiving, at a second time, by the first device from the second device, after transmitting the RTS frame, a clear to send (CTS) frame including a second duration, where the second duration is a duration of a speed frame (SF) exchange. The method also includes transmitting, by the first device to the second device, after receiving the CTS frame, a first data frame and receiving, by the first device from the second device, after transmitting the first data frame, a second data frame.

An embodiment method includes receiving, by a first device from a second device, a request to send (RTS) frame including a first duration and determining a second duration in accordance with the first duration. The method also includes transmitting, by the first device to the second device, after receiving the RTS frame, a clear to send (CTS) frame including the second duration, where the second duration is a duration of a speed frame (SF) exchange and receiving, by the first device from the second device, after transmitting the CTS frame, a first data frame. Additionally, the method includes transmitting, by the first device to the second device, after receiving the first data frame, a second data frame.

An embodiment user equipment (UE) includes a processor and a non-transitory computer readable storage medium storing programming for execution by the processor. The programming includes instructions to receive, at a first time, from a first device, a request to send (RTS) frame including a first duration and receive, at a second time, from a second device, a clear to send (CTS) frame including a second duration. The programming also includes instructions to determine a duration of a speed frame exchange (SF) exchange in accordance with the first duration and the second duration.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 illustrates a message diagram for a method of speed frame (SF) exchange;

FIG. 3 illustrates another message diagram for a method of SF exchange;

FIG. 4 illustrates a message diagram for a method for network allocation vector (NAV) settings for one way frame transmission;

FIG. 5 illustrates a message diagram for a method for NAV settings for an SF exchange;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
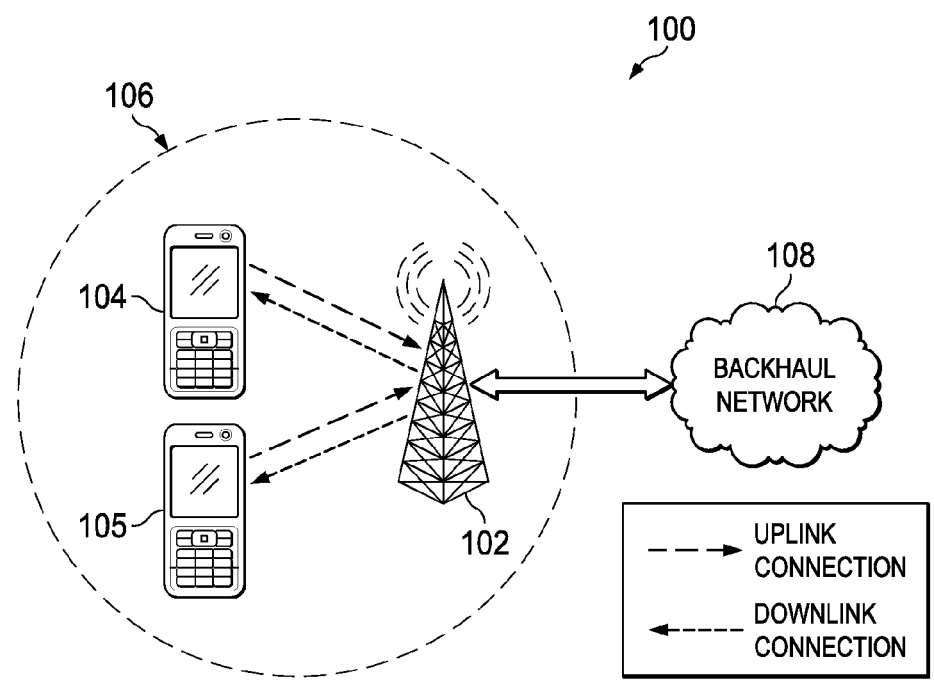
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by, inter alia, establishing uplink (dashed line) and/or downlink (dotted line) connections with UE 104 and UE 105, such as a base station, an enhanced base station (eNB), an access point, a picocell, a femtocell, and other wirelessly enabled devices. UE 104 and UE 105 may be any component capable of establishing a wireless connection with communications controller 102, such as cell phones, smart phones, tablets, sensors, station (STA), etc. Backhaul network 108 may be any component or collection of components that allow data to be exchanged between communications controller 102 and a remote end. In some embodiments, the network 100 may include various other wireless devices, such as relays, etc.

Speed frame (SF) exchange is a method of exchanging a sequence of uplink and downlink Physical layer Protocol Data Units (PPDUs) in a transmission opportunity (TXOP) between a communications controller and a UE. FIG. 2 illustrates messaging diagram 110 for an SF exchange between UE 114 and communications controller (CC) 112 with uplink and downlink data. In this example, there are more uplink data frames than downlink data frames. For example, a smart meter has more uplink data frames than downlink data frames. Other examples may have more downlink data frames than uplink data frames or an equal number of uplink data frames and downlink data frames. UE 114 wakes up from sleep, for example at a scheduled wake-up time. Then, communications controller 112 transmits a downlink beacon frame to UE 114. The beacon frame may include a traffic indication map (TIM).

UE 114 transmits an uplink data frame to communications controller 112 containing an indication that UE 114 has more data to transmit (MoreData=1), and that it expects a long response frame of a data frame (RspFrm=Long). UE 114 has prior knowledge of the existence of downlink data, for example from the TIM bit in the beacon frame. After a short interframe space (SIFS), communications controller 112 transmits a data frame to UE 114 indicating that communications controller 112 has more buffered data ready for transmission and expects a long response of a data frame. This process continues with UE 114 and communications controller 112 alternately transmitting data frames with a SIFS between the data frames. Then, communications controller 112 transmits a data frame where MoreData=0, indicating that communications controller 112 does not have additional data. After a SIFS, UE 114 transmits a data frame with MoreData=1, indicating that UE 114 has more data to transmit, and RspFrm=Normal, indicating that it expects a response of a normal acknowledgment frame. After a SIFS, communications controller 112 transmits an acknowledgement frame with MoreData=0 and RspFrm=Long.

The alternation of uplink data frames and acknowledgment frames continues until UE 114 is out of data, and UE 114 transmits a data frame with MoreData=0 and RspFrm=Normal. After SIFS, communications controller 112 transmits an acknowledgement frame with MoreData=0 and RspFrm=No, indicating that it does not expect a response frame. Then, UE 114 returns to sleep.

FIG. 3 illustrates message diagram 120 with a null data packet (NDP) power save (PS)-poll frames in an SF exchange. In this example, UE 124 and communications controller 122 have an unequal number of uplink and downlink frames. Communications controller 122 transmits a beacon frame to UE 124 with the TIM bit set for the UE. UE 124 wakes up from sleep, and UE 124 transmits an NDP PS-Poll frame to communications controller 122. A PS-Poll frame indicates that the UE is in an active state and ready to receive buffered downlink packets. An NDP is a physical layer convergence procedure (PLCP) protocol data unit (PPDU) which carries no data field. Thus, and NDP PS-Poll frame may be a physical layer header only packet which carries no data field and no medium access control (MAC) frame. Additional details on an NDP PS-Poll frames are included in U.S. patent application Ser. No. 13/798,472 filed on Mar. 13, 2013, and which application is hereby incorporated herein by reference.

After a SIFS, communications controller 122 transmits a data frame with MoreData =1 and RspFrm=Long. Then, after a SIFS, UE 124 responds with a data frame with MoreData =1 and RspFrm=Long. UE 124 and communications controller 122 continue to exchange data frames until communications controller 122 transmits a data frame with MoreData=0, indicating that it does not have additional data for downlink. After a SIFS, UE 124 transmits a data packet with MoreData=1, indicating that it has more data for uplink, and RspFrm=NDP, indicating that it expects a response of an NDP acknowledgment frame, a short acknowledgment frame. After a SIFS, communications controller 122 transmits an NDP acknowledgement frame with MoreData=0, Duration Indication=0, and Duration=1. UE 124 continues to send data frames until it is out of data, when it sends a data frame with MoreData=0, indicating that it does not have additional uplink data, and RspFrm=NDP. Communications controller 122 responds after a SIFS with an NDP acknowledgement (ACK) frame with MoreData=0, Duration Indication=0, and Duration=0, indicating that the exchange is over, and UE 124 returns to sleep.

A request to send (RTS) clear to send (CTS) mechanism may be used to protect the exchange sequence in an SF exchange. However, the process for setting the RTS/CTS mechanism for an SF exchange may be unclear, because the transmitter of the RTS frame does not have information on whether the receiver wants to participate in SF exchange, and the transmitter of the RTS frame might not be able to estimate the duration of both its own transmission and the transmission in the reverse direction.

FIG. 4 illustrate message diagram 130 for network allocation vector (NAV) settings for an RTS/CTS mechanism for one way frame transmission. Initially, communications controller 132 transmits an RTS frame containing a duration field with the total frame transmission time accounting for SIFS, a CTS frame, a downlink data frame, and an acknowledgement frame. Other UEs 136 receive the duration field and set NAV (RTS) to its value. After a SIFS, UE 134 transmits a CTS frame, with a duration including SIFS, a downlink data frame, and an acknowledgement frame. Other UEs 136 set NAV (CTS) to the CTS duration field value. The end of the NAV (CTS) coincides with the end of the NAV (RTS). After a SIFS, communications controller 132 transmits a data frame to UE 134. Then, after a SIFS, UE 134 transmits an acknowledgement frame to communications controller 132. The end of the acknowledgement frame coincides with the end of NAV (RTS) and NAV (CTS).

FIG. 5 illustrates message diagram 140 for a method for NAV settings for an RTS/CTS mechanism used in an SF exchange. Communications controller 142 transmits an RTS frame with a duration field. Other UEs 146 set NAV (RTS) based on the duration field of the RTS frame. After a SIFS, UE 144 transmits a CTS frame, with a duration field, which is received by communications controller 142 and other UEs 146. Other UEs 146 set NAV (CTS) based on the duration field of the CTS frame. The NAV (RTS) and NAV (CTS) frames do not consider the extended duration for the SF exchange. After a SIFS, communications controller transmits a data frame to UE 144. Then, after a SIFS, UE 144 transmits a data frame, which is not an acknowledgement frame, to communications controller 142. Next, after a SIFS, communications controller 142 transmits an acknowledgement frame. There is no protection from the end of the NAV (RTS)/NAV (CTS) through the remainder of the SF exchange.

In an embodiment method of SF exchange, a duration field in a CTS frame includes the transmission time for both directions of an SF exchange. The duration field in the CTS frame is calculated based on the duration field from the received RTS frame adjusted by subtracting the time of transmission of the CTS frame and adding the time to transmit the data frame from the sender of the CTS frame. The transmitter of the RTS frame may identify whether the transmitter of the CTS frame has initiated an SF exchange by identifying that the duration in the CTS frame is different from the value calculated in a traditional method.

In another embodiment method of SF exchange, a more data (MD) field is set to 1 in a PS-Poll frame to initiate the SF exchange. When MD=1 in the PS-Poll frame, the duration field of the PS-Poll frame indicates the required time for the subsequent MAC protocol data unit (MPDU) transmission, acknowledgement, and inter-frame space (IFS) durations. The communications controller sets the duration field for the RTS frame to include data transmission in both directions for an SF exchange. The duration field for the CTS frame is calculated based on the duration field from the received RTS frame, adjusted by subtracting the time to transmit the CTS frame.

Figure 6:
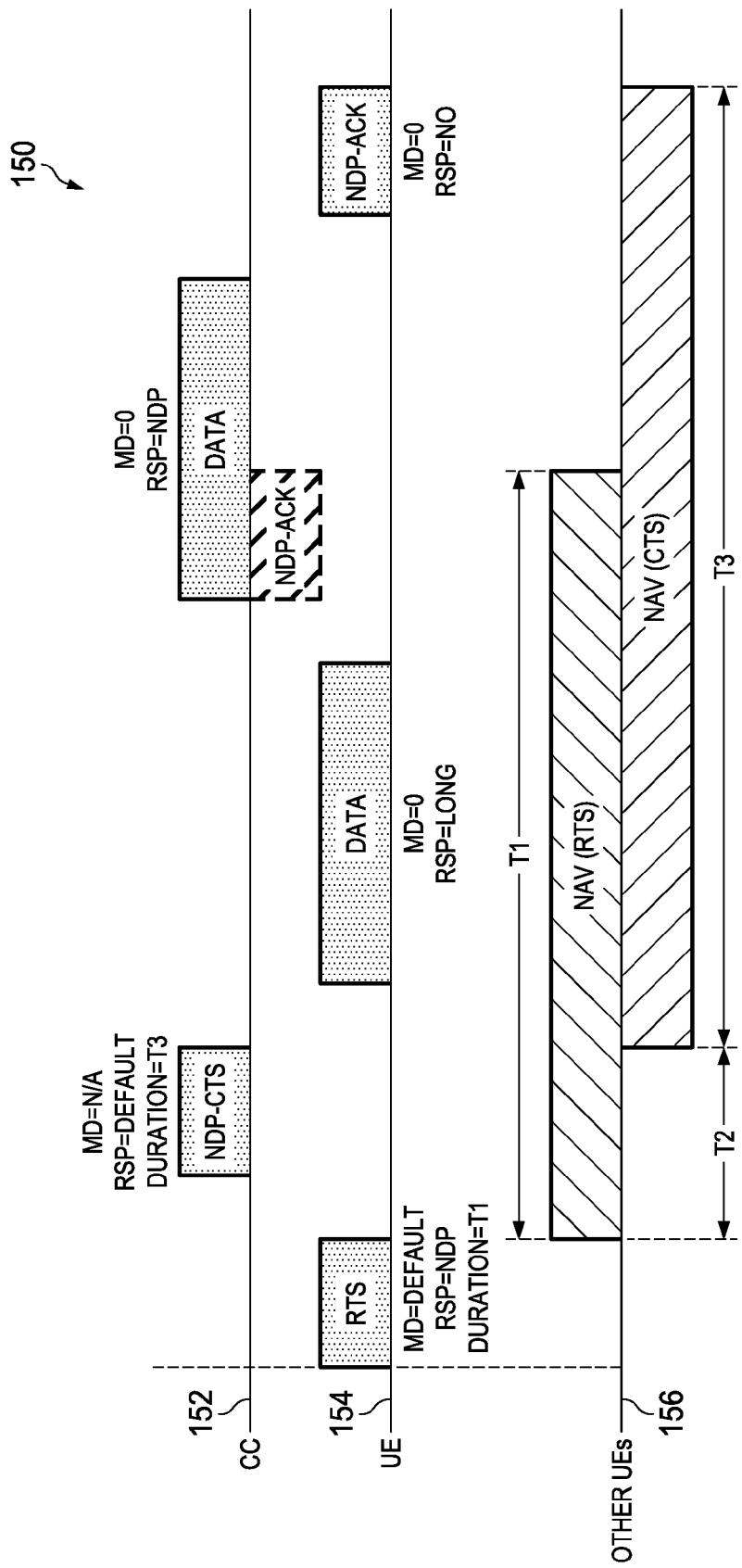
FIG. 6 illustrates a message diagram for an embodiment method for NAV settings for an SF exchange.

FIG. 6 illustrates message diagram 150 for a method of setting the duration for an SF exchange with one uplink data frame and one downlink data frame being exchanged between UE 154 and communications controller 152. UE 154 transmits an RTS frame with the more data (MD) field set to default, indicating that UE 154 has more data, and the response indication (Rsp) field set to NDP, indicating that the expected response is a null data packet, and a duration field set to T1. When a regular CTS frame is used, the response indication field may be set to normal. The duration T1 is the time for the expected response, the uplink data frame, the expected acknowledgement frame, and appropriate SIFS. Other UEs 156 set NAV (RTS) to T1.

Then, after a SIFS, communications controller 152 transmits an NDP-CTS frame with a duration of T3. The NDP-CTS frame does not have a frame control field, so it does not have a more data field or response indication field. Communications controller 152 initiates the SF exchange, which is indicated by the duration field of T3, which is larger than the expected duration for a single data frame. T3 is equal to the data frame communications controller 152 is expecting from UE 154, the data frame communications controller expects to transmit to UE 154, the acknowledgement frame communications controller 152 expects from UE 154, and the accompanying SIFS. Other UEs 156 receive the NDP-CTS frame with the duration of T3, and set NAV (CTS) based on T3. Because T3 is not equal to the expected conventional duration of a single exchange (T1–T2), the other UEs know that an SF exchange has been initiated. Thus, the entire transfer period may be protected. Also, UE 154 determines that a SF exchange has been initiated. In another example, a regular CTS frame is used, which has an MD field, for example set to zero, and a response indication field, for example set to long.

After a SIFS, UE 154 transmits a data frame with MD=0, indicating that UE 154 does not have additional data, and Rsp=Long, indicating that UE 154 expects a long response of a data frame. Then, after a SIFS, communications controller 152 transmits a data frame with MD=0, indicating that communications controller 152 does not have more data, and Rsp=NDP, indicating that it expects a response of an NDP. Communications controller 152 expects an NDP response because UE 154 has indicated that it does not have additional data.

After a SIFS, UE 154 transmits an NDP-ACK frame with MD=0, indicating that UE 154 does not have more data, and Rsp=No, indicating that UE 154 does not expect a response.

Figure 7:
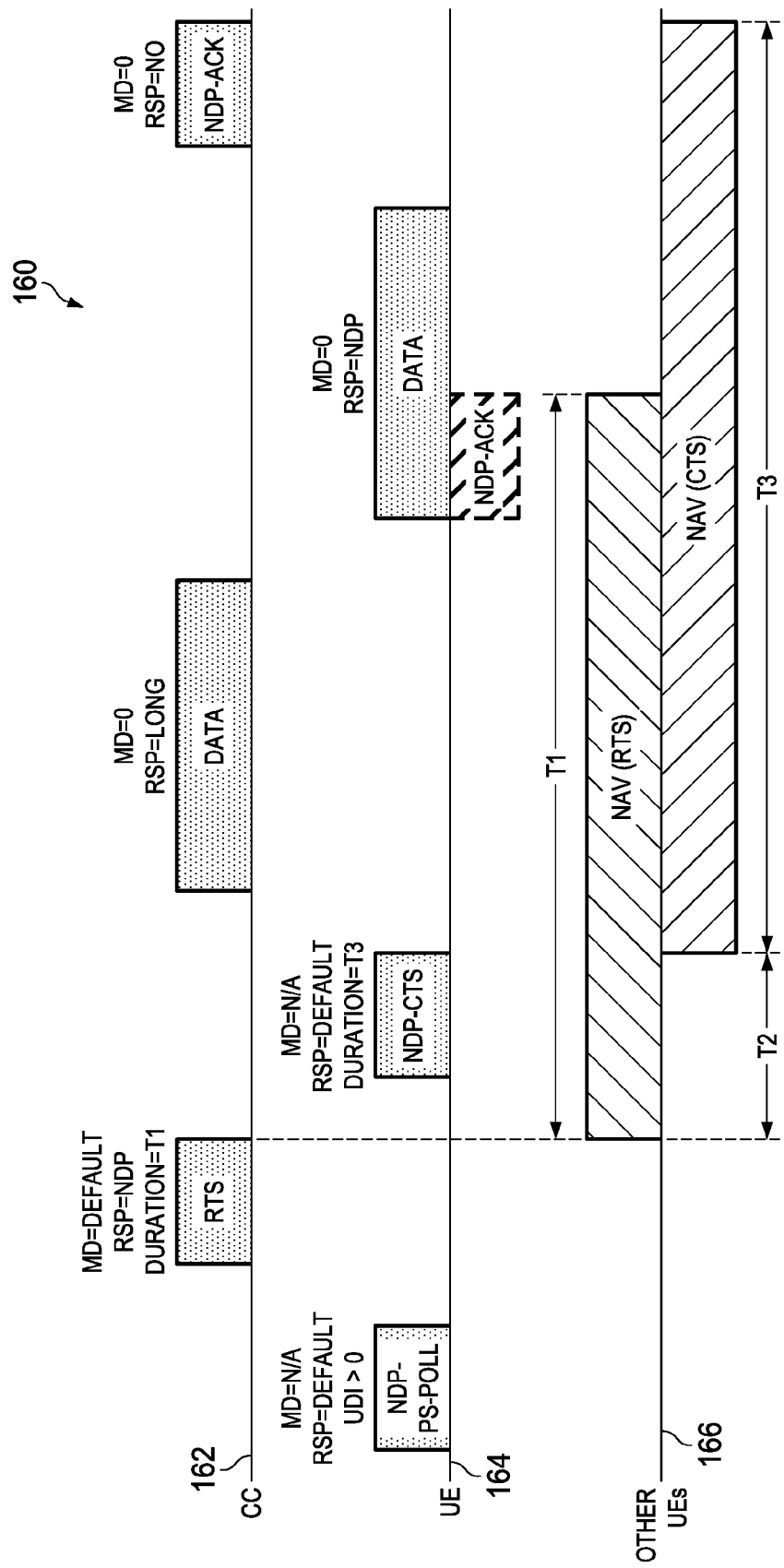
FIG. 7 illustrates a message diagram for another embodiment method for NAV settings for an SF exchange.

FIG. 7 illustrates message diagram 160 for a method of communicating the duration for an SF exchange between UE 164 and communications controller 162. UE 164 transmits an NDP PS-Poll frame to indicate that it is active. The uplink data indication (UDI) field of the NDP PS-Poll frame is set to a non-zero value to indicate that the UE has buffered uplink data. There is no MD field, or response indicator in the NDP PS-Poll frame. After a SIFS, communications controller 162 responds with an RTS frame with an MD field of default, a response field of NDP, indicating that the communications controller expects an NDP response, and a duration of T1. The duration T1 is the duration of communications controller 162 transmitting a single data frame, and not for an SF exchange. T1 is equal to the time for an NDP response from UE 164, a data frame from itself, and an NDP acknowledgment from the UE, with SIFS in between. Other UEs 166 set the duration to NAV (RTS) to be equal to T1.

In response, UE 164 transmits an NDP-CTS frame with no MD or response indication field, and a duration of T3 after a SIFS. In another example, a regular CTS frame with an MD field set to zero and a response indication field set to long. The NDP-CTS frame initiates the SF exchange by setting the duration to T3, which is different than the expected duration for a single data frame, which would be T1–T2, or the duration of the data frame and an NDP acknowledgment, including SIFS. This notifies communications controller 162 and other UEs 166 that an SF exchange has been initiated. Other UEs 166 set the duration to NAV (CTS) to T3.

Then, after a SIFS, communications controller 162 transmits a data frame to UE 164 with MD=0, indicating that the communications controller does not have more data for downlink, and Rsp=Long, indicating that the communications controller expects a long response of a data frame from UE 164. After a SIFS, UE 164 responds to communications controller 162 with a data frame with MD=0, indicating that UE 164 does not have more data for uplink, and Rsp=NDP, indicating that UE 164 expects an NDP acknowledgement response. In another example, the response indication field is set to normal. The response indication field is set to NDP response because the received MD bit was set to zero.

Communications controller 162 transmits an NDP acknowledgement to UE 164 after a SIFS with MD=0, indicating that communications controller 162 does not have more data, and Rsp=No, indicating that communications controller 162 does not expect a response. Thus SF exchange is completed. In another example, a regular acknowledgment frame is used.

Figure 8:
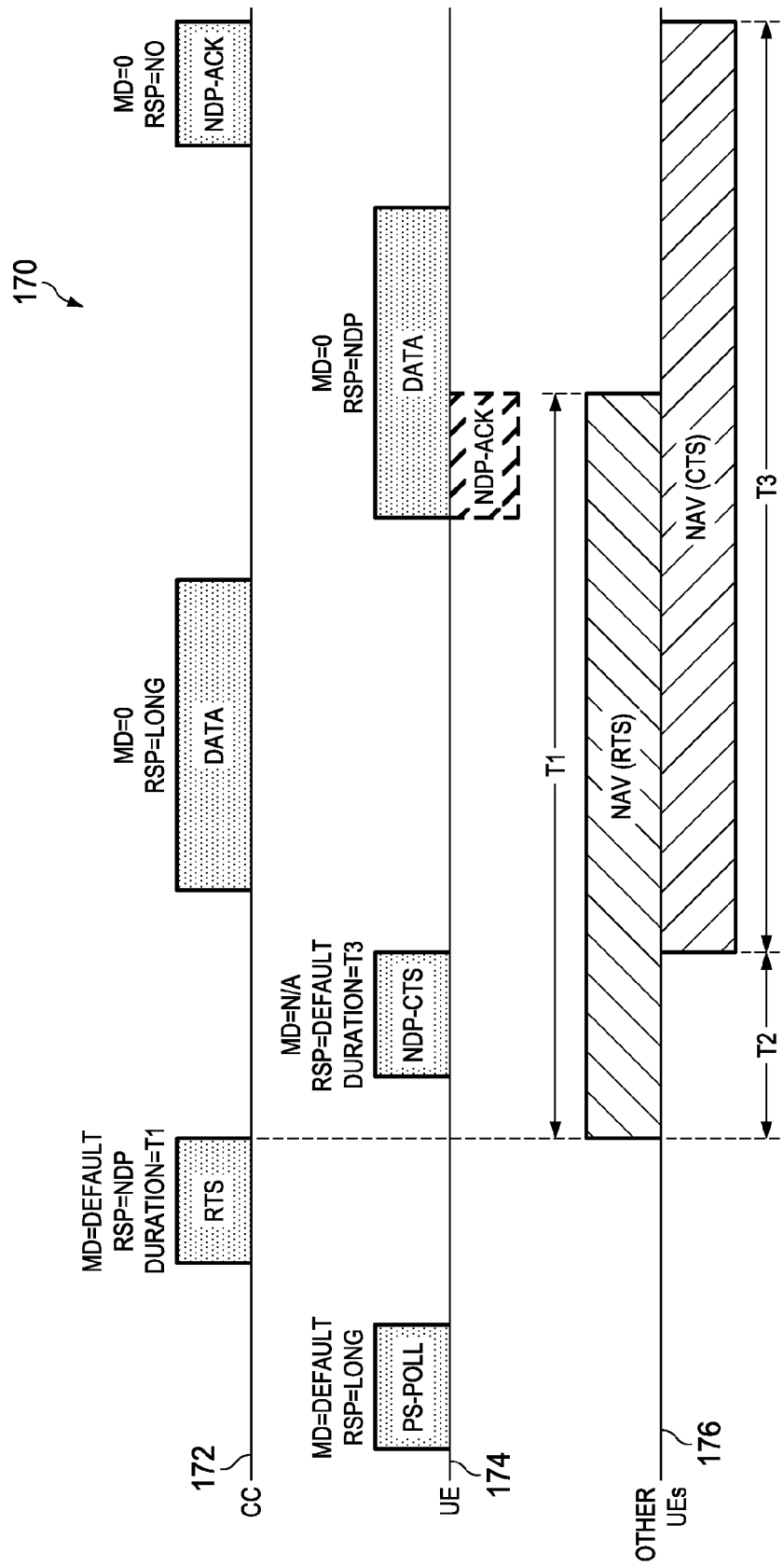
FIG. 8 illustrates a message diagram for an additional embodiment method fir NAV settings for an SF exchange.

FIG. 8 illustrates message diagram 170 for setting the duration for an SF exchange using a PS-Poll frame, and using NDP CTS and ACK frames. There is one uplink data frame and one downlink data frame exchanged between communications controller 172 and UE 174. Initially, UE 174 transmits a PS-Poll frame with an MD of 0, which is the default value, and with a response indication frame of long. The PS-Poll frame indicates that UE 174 is in the active state.

After a SIFS, communications controller responds with an RTS frame, where the MD field is set to the default, the response indication field set to NDP, and the duration set to T1, which indicates the duration of an NDP response, the communications controller's data frame, an NDP acknowledgement, and appropriate SIFS. Duration T1 does not indicate the SF exchange or the uplink data frame. After a SIFS, UE 174 responds with an NDP-CTS frame without an MD or response field with a duration of T3. In another example, a regular CTS frame with an MD field set to zero and a response indication field set to long is used. The duration of T3, which includes the downlink data frame, an uplink data frame, an acknowledgement frame, and the SIFS, indicates the SF exchange, because it is greater than T1–T2, which would have a duration equal to the downlink data frame and an acknowledgement with SIFS. The duration T3 indicates the SF exchange to both communications controller 172 and other UEs 176. Other UEs 176 set the duration to NAV (CTS) from T3.

After a SIFS, communications controller 172 transmits a data frame with MD=0, indicating that communications controller 172 does not have more data, and a response indication field of long, indicating that the communications controller expects a long response of an uplink data frame from UE 174. UE 174 transmits an uplink data frame in response after a SIFS. The uplink data frame has MD=0, indicating that the UE does not have more uplink data, and Rsp=NDP, indicating an expected response of an NDP. This is because the MD bit of the downlink data frame is set to 0, and thus an acknowledgment frame is expected. In another example, Rsp is set to normal for a normal acknowledgment frame.

Finally, after a SIFS, communications controller 172 transmits and NDP-ACK frame ending the SF exchange. Alternatively, the communications controller transmits a normal acknowledgment frame. MD is set to zero, which indicates that communications controller 172 does not have more downlink data, and the response indication field is set to no response, because the communications controller does not expect a response.

Figure 9:
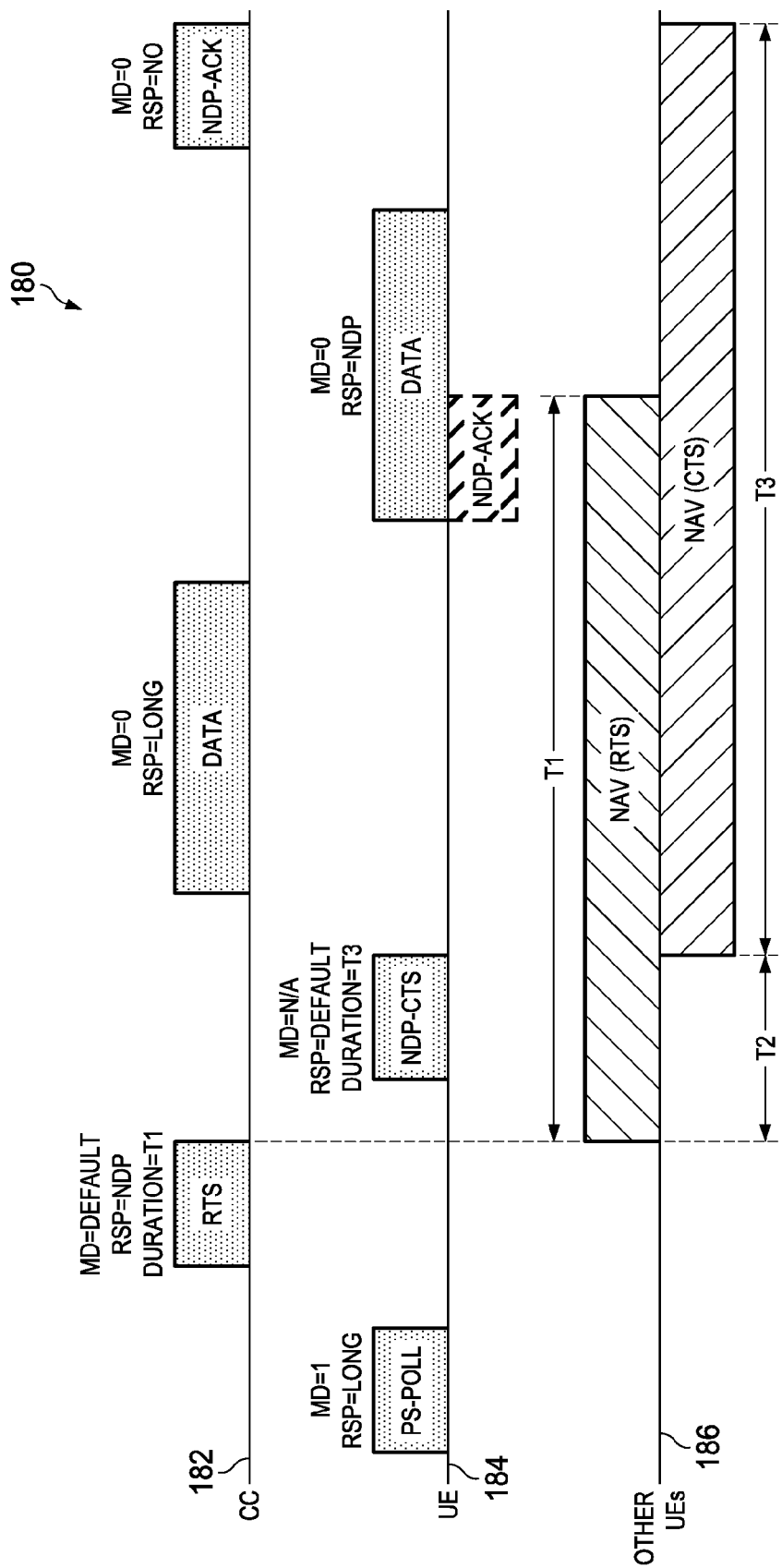
FIG. 9 illustrates a message diagram for another embodiment method for NAV settings for an SF exchange.

FIG. 9 illustrates message diagram 180 for determining the duration in an SF exchange where a UE transmits a PS-Poll frame. In one example, NDP frames are used for the CTS and ACK. Alternatively, regular CTS and ACK frames are used. One uplink data frame and one downlink data frame are exchanged. Initially, UE 184 transmits a PS-Poll frame with MD=1 and Rsp=long, indicating that the UE is active. The MD field indicates that the UE has uplink data, and that it expects a long response. Communications controller 182 responds with an RTS frame after a SIFS. In the RTS frame, MD is set to default, the response indication field is set to NDP, indicating that the communications controller expects an NDP response, and the duration is set to T1, which is the duration for only a downlink frame, included the NDP response and an NDP acknowledgement, along with appropriate SIFS. In another example, the response indication field is set to regular. Other UEs 186 set the duration to NAV (RTS) at T1. In response, after a SIFS, UE 184 transmits an NDP-CTS frame with no MD field or response indication field, and a duration of T3. Alternatively, a regular CTS frame is used, with the MD field set to zero and the response indication field set to long. The duration of T3, which includes the duration for a downlink data frame, an uplink data frame, an acknowledgment, and SIFS for the SF exchange to communications controller 182. The duration T3 is greater than the duration for a downlink frame only of T1–T2, which would include the duration of a downlink data frame and an acknowledgement with SIFS. Other UEs 186 set the duration NAV (CTS) to T3.

Then, after a SIFS, communications controller 182 transmits a data frame with MD=0, indicating that it does not have more data for downlink, and Rsp=long, indicating an expected long response of an uplink data frame. In response, after a SIFS, UE 184 transmits an uplink data frame with MD=0, indicating that the UE does not have more data for uplink, and Rsp=NDP, indicating that it expects a response of an NDP. This NPDP response is because the communication controller's MD bit was set to zero. Alternatively, the response indication field is set to normal.

In response, after a SIFS, communications controller 182 transmits an NDP-ACK frame with MD=0, indicating that the communications controller does not have more data for downlink, and Rsp=No, indicating that it does not expect a response. Alternatively, communications controller 182 transmits a regular acknowledgment frame.

Figure 10:
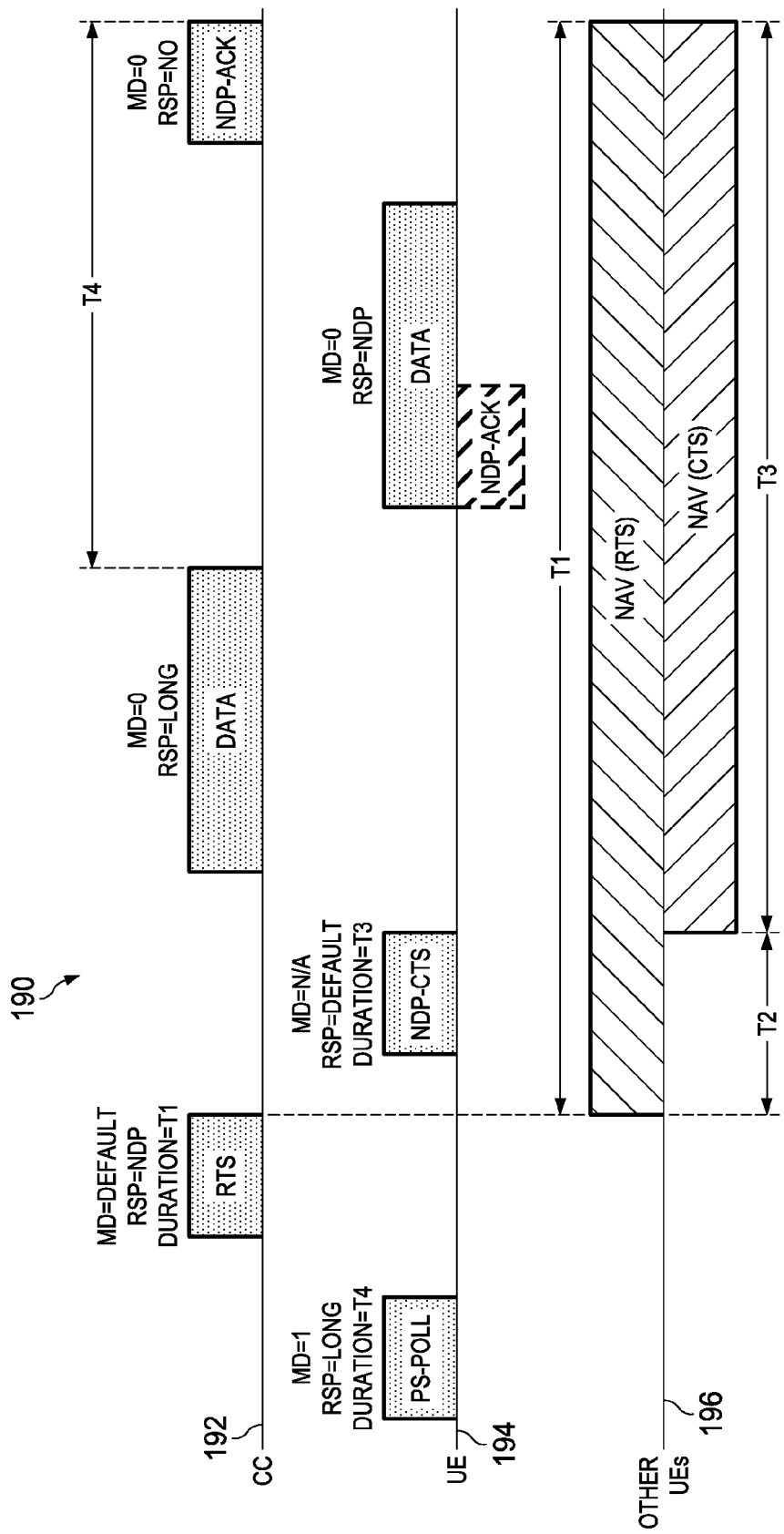
FIG. 10 illustrates a message diagram for an additional embodiment method for NAV settings for an SF exchange.

FIG. 10 illustrates message diagram 190 for determining the duration for SF exchange using a PS-Poll frame with a duration field indicating an SF exchange. There is one uplink data frame and one downlink data frame in this exchange. UE 194 transmits a PS-Poll frame with MD=1, Rsp=Long, and duration=T4. The value of MD=1 indicates that the UE has buffered data for transmission and initiates the SF exchange. Also, UE 194 expects a long response. The duration T4 indicates the uplink duration, including the duration of the uplink data frame, of an NDP-ACK, and appropriate SIFS. Communications controller 192 responds to the PS-Poll frame with an RTS frame after a SIFS. In the RTS frame, MD is set to the default, the response indication field is set to NDP, and the duration is set to T1. Communications controller 192 uses duration T4 to determine the duration T1. In another example, the response indication field is set to regular. T1 is the duration of the SF exchange, including the NDP-CTS, the downlink data frame, the uplink data frame, the NDP-ACK frame, and appropriate SIFS. Other UEs 196 set the duration NAV (RTS) to T1. After a SIFS, UE 194 responds with an NDP-CTS frame with no MD field or response indication field, and a duration of T3. T3=T1−T2, where T2 is the duration of a SIFS and the NDP-CTS frame. Other UEs 196 set NAV (CTS) to T3. Alternatively, UE 194 transmits a regular CTS frame with MD=0 and Rsp=long.

Next, after a SIFS, communications controller 192 responds with a downlink data frame with MD=0, indicating that the communications controller does not have more buffered data for downlink, and the response indication field set to long, indicating that communications controller 192 expects a long response of an uplink data frame. Then, after a SIFS, UE 194 transmits an uplink data frame with MD=0, indicating that UE 194 does not have more buffered data for uplink, and the response indication field equal to NDP, indicating an expected response of an NDP. In another example, the response indication field is normal.

After a SIFS, communications controller 192 responds with an NDP-ACK, where MD=0, indicating that communications controller 192 does not have more buffered data for downlink, and the response indication field equal to no response, indicating that communications controller 192 does not expect a response. Alternatively, a regular acknowledgment frame is used.

Other embodiments involve more uplink frames and/or more downlink frames. There may be more uplink data frames than downlink data frames, or more downlink data frames than uplink data frames, or the same number of downlink frames and uplink frames.

Figure 11:
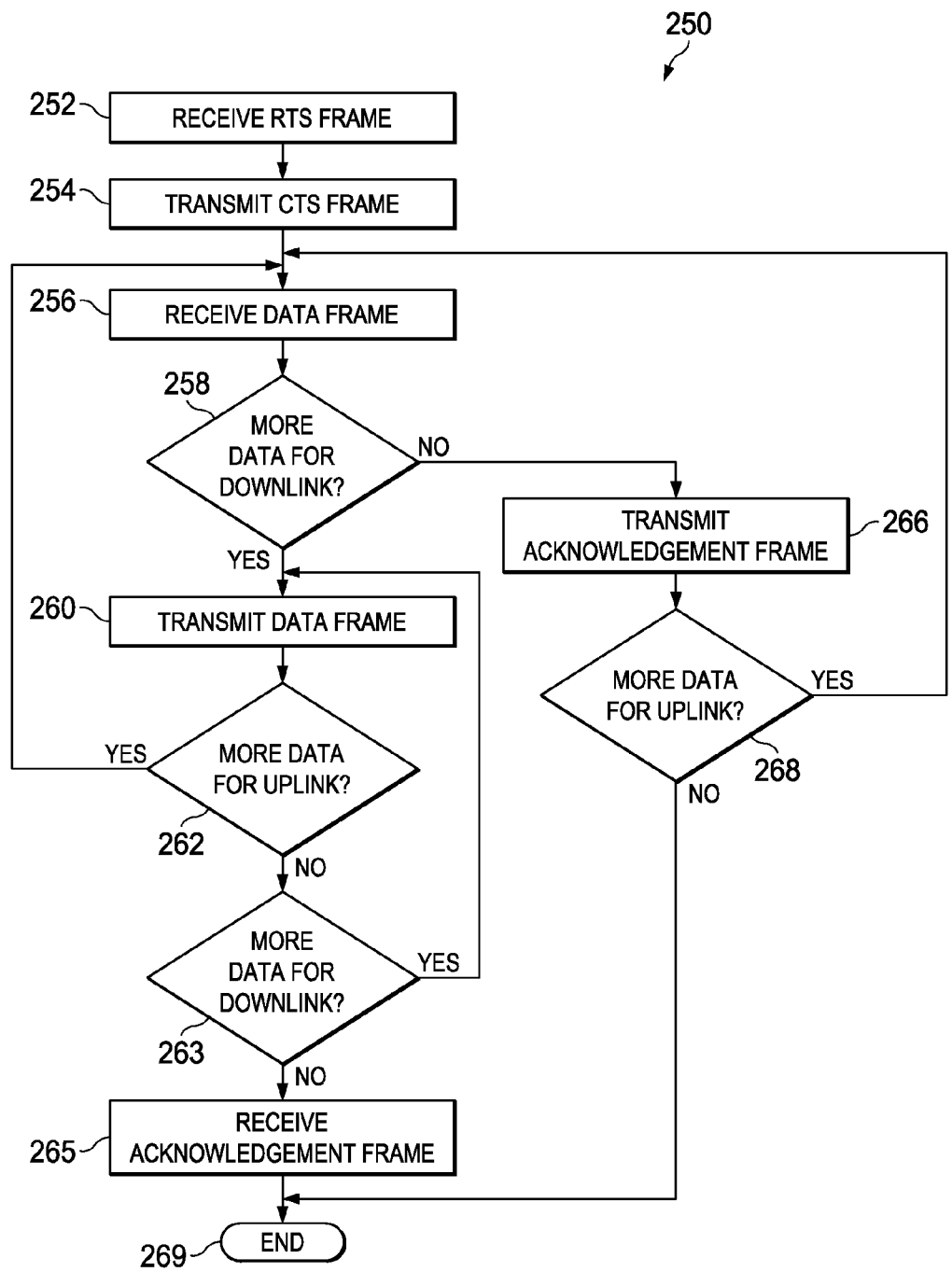
FIG. 11 illustrates a flowchart for an embodiment method of NAV settings for an SF exchange performed by a communications controller.

FIG. 11 illustrates flowchart 250 for a method of determining the duration in an SF exchange performed by a communications controller. Initially, in step 252, the communications controller receives an RTS frame from a UE indicating that the UE is awake and has data ready. The RTS frame may have a more data field of default, a response indication field of NDP, and a duration of T1, where T1 is the duration of an uplink data transmission, including a CTS frame, an uplink data frame, an acknowledgment frame, and the appropriate SIFS.

In response to the RTS frame, in step 254, the communications controller transmits a CTS frame. The CTS frame may be an NDP-CTS frame or a normal CTS frame. An NDP-CTS frame does not have a more data field or a response indication field, and has a duration field equal to T3, the duration of the SF exchange. T3 is the time for an SF exchange, including an uplink data frame, a downlink data frame, and an NDP acknowledgement frame, with appropriate SIFS. T1 is used in determining T3. A regular CTS frame may have a more data field set to 0 and a response indication field set to long response, and the duration field set to T3.

In step 256, the communications controller receives an uplink data frame from the UE, for example within a SIFS of transmitting the CTS frame. The uplink data frame has a more data field, where, for example, a value of 1 indicates that the UE has more buffered data ready for uplink and a value of 0 indicates that the UE does not have more buffered data for uplink. The response frame may be long when the UE expects a downlink data frame, NDP when the UE expects an NDP acknowledgment frame, and default when the UE expects a normal acknowledgement frame.

Next, in step 258, the communications controller determines whether it has more buffered data for downlink. When the communications controller has more buffered data for downlink, it proceeds to step 260 to transmit a data frame. On the other hand, when the communications controller does not have more data for downlink, it proceeds to step 266 to transmit an acknowledgement frame.

In step 260, the communications controller transmits a downlink data frame to the UE, for example within a SIFS of receiving a frame. The downlink data frame includes a more data field, which indicates whether the communications controller has more data for downlink. Also, the downlink data frame contains a response indication field, where a value of long response indicates that the communications controller expects an uplink data frame in response, a value of NDP indicates that the communications controller expects an NDP acknowledgement frame as a response, and a value of default indicates that the UE expects a normal acknowledgement frame as a response.

Then, in step 262, the communications controller determines whether it expects more uplink data, for example based on the MD field of the uplink data frame received in step 256. When the communications controller expects another uplink data frame from the UE, it proceeds to step 256 to receive an uplink data frame. On the other hand, when the communications controller does not expect another uplink data frame, it proceeds to step 263.

In step 263, the communications controller determines whether it has more data for downlink. When the communications controller has more buffered data ready for downlink, it proceeds to step 260 to transmit another data frame. When the communications controller does not have more data for downlink, it proceeds to step 265.

In step 265, the communications controller receives an acknowledgement frame from the UE, for example within a SIFS of transmitting the data frame in step 260. The acknowledgement frame may be a normal acknowledgement frame or an NDP acknowledgement frame. Both types of acknowledgement frames have an MD value of 0, indicating that the UE does not have more data, and a response indication field of no, indicating that the UE does not expect a response. The procedure then ends in step 269.

In step 266, the communications controller transmits an acknowledgement frame to the UE. The acknowledgement frame may be an NDP acknowledgement frame or a regular acknowledgement frame. The acknowledgment frame has a MD field of 0, indicating that the communications controller does not have more data for downlink. The response indication field may be a no response or a long, depending on whether the UE has more buffered data for uplink.

Next, in step 268, the communications controller determines whether the UE has more data for uplink. When the UE has more data for uplink, the communications controller goes to step 256 to receive the uplink data frame. On the other hand, when the UE does not have more data for uplink, the communications controller goes to step 269 to end the procedure.

Figure 12:
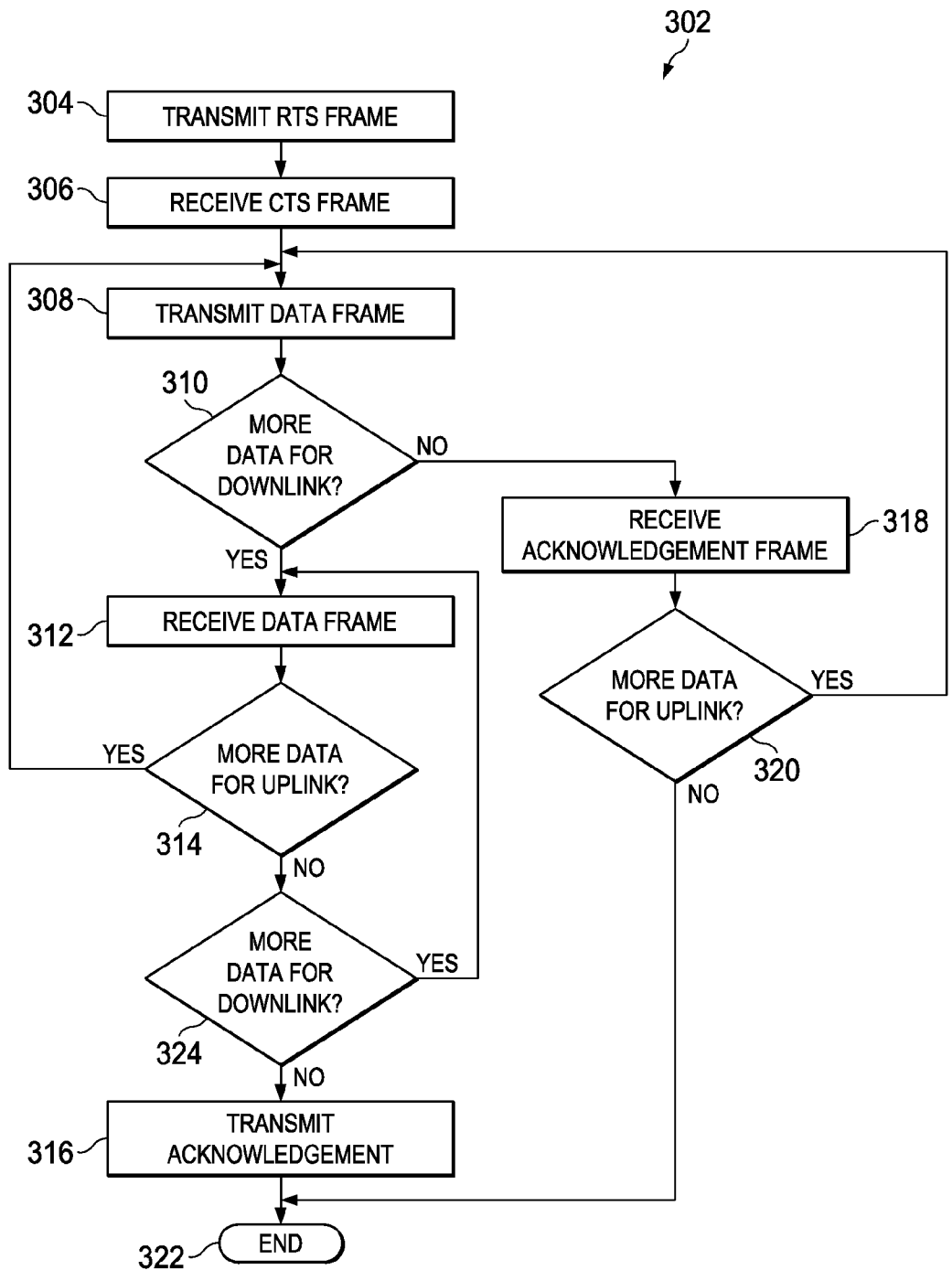
FIG. 12 illustrates a flowchart for an embodiment method of NAV settings for an SF exchange performed by a user equipment (UE) performing the SF exchange.

FIG. 12 illustrates flowchart 302 for a method of determining the duration of an SF exchange performed by a UE involved in the SF exchange. Initially, in step 304, the UE transmits an RTS frame to a communications controller indicating that the UE is awake and ready to transmit data. The RTS frame may have no MD field, a response indication field of NDP, and a duration of T1, where T1 is the duration of an uplink frame from the UE to a communications controller. T1 may be equal to the duration of a CTS frame (regular or NDP), and uplink data frame, and an acknowledgement frame (regular or NDP), with appropriate SIFS.

In response, in step 306, the UE receives a CTS frame from the communications controller, for example within a SIFS of transmitting the RTS frame. The CTS frame may be a regular CTS frame or an NDP-CTS frame, with an MD field of 0 or no MD field, and a response indication frame of long response or no response, respectively. Both types of CTS frames may contain a duration field with a value of T3, where T3 is the duration of the SF exchange. T3 is the duration of the uplink data frame, a downlink data frame, an acknowledgment frame (regular or NDP), with appropriate SIFS.

Then, in step 308, the UE transmits a data frame to the communications controller, for example within a SIFS of receiving a CTS, data, or acknowledgment frame. The data frame has an MD field indicating whether the UE has more data for uplink and a response indication frame indicating the response the UE expects, for example a long frame when the UE expects a data frame, a default frame when the UE expects a regular acknowledgement frame, and NDP when the UE expects an NDP acknowledgment frame.

Next, in step 310, the UE determines whether there is more data for downlink, for example based on a received more data field. When there is more data for downlink, the UE proceeds to step 312 to receive a downlink data frame. When there is no more data for downlink, the UE proceeds to step 318 to receive an acknowledgement frame.

In step 312, the UE receives a data frame from the communications controller, for example a SIFS after transmitting a data frame or an acknowledgment frame. The data frame includes an MD field and a response indication frame, where the MD field indicates whether the communications controller has more data for uplink and the response indication field indicates the response type the communications controller expects.

Next, in step 314, the UE determines whether there is more data for uplink. When there is more buffered data for uplink, the UE goes to step 308 to transmit an uplink data frame. When there is not more data for uplink, the UE proceeds to step 324.

In step 324, the UE determines whether there is more data for downlink. For example, the UE may determine whether there is more data for downlink based on the MD field in the data frame received in step 312, or from an acknowledgment frame. When there is more data for downlink, the UE proceeds to step 312 to receive a downlink data frame from the communications controller. When there is no more data for uplink, the UE proceeds to step 316.

In step 316, the UE transmits an acknowledgment frame to the communications controller, for example within a SIFS of receiving a data frame. The acknowledgment frame may be a regular acknowledgement frame or an NDP acknowledgement frame. In both acknowledgement frame types, MD is set to zero and the response type is set to no response. The, the procedure ends in step 322.

In step 318, the UE receives an acknowledgement frame from the communications controller, for example within a SIFS of transmitting a data frame. The acknowledgement frame may be an NDP acknowledgement frame or a regular acknowledgment frame. The acknowledgment frame may have an MD value of zero, and a response indication field with the response the communications controller is expecting, for example long or none.

Then, in step 320, the UE determines whether it has more buffered data for uplink. When the UE has more buffered data for uplink, it proceeds to step 308 to transmit the data to the communications controller. When the UE does not have more buffered data for uplink, it ends the procedure in step 322.

Figure 13:
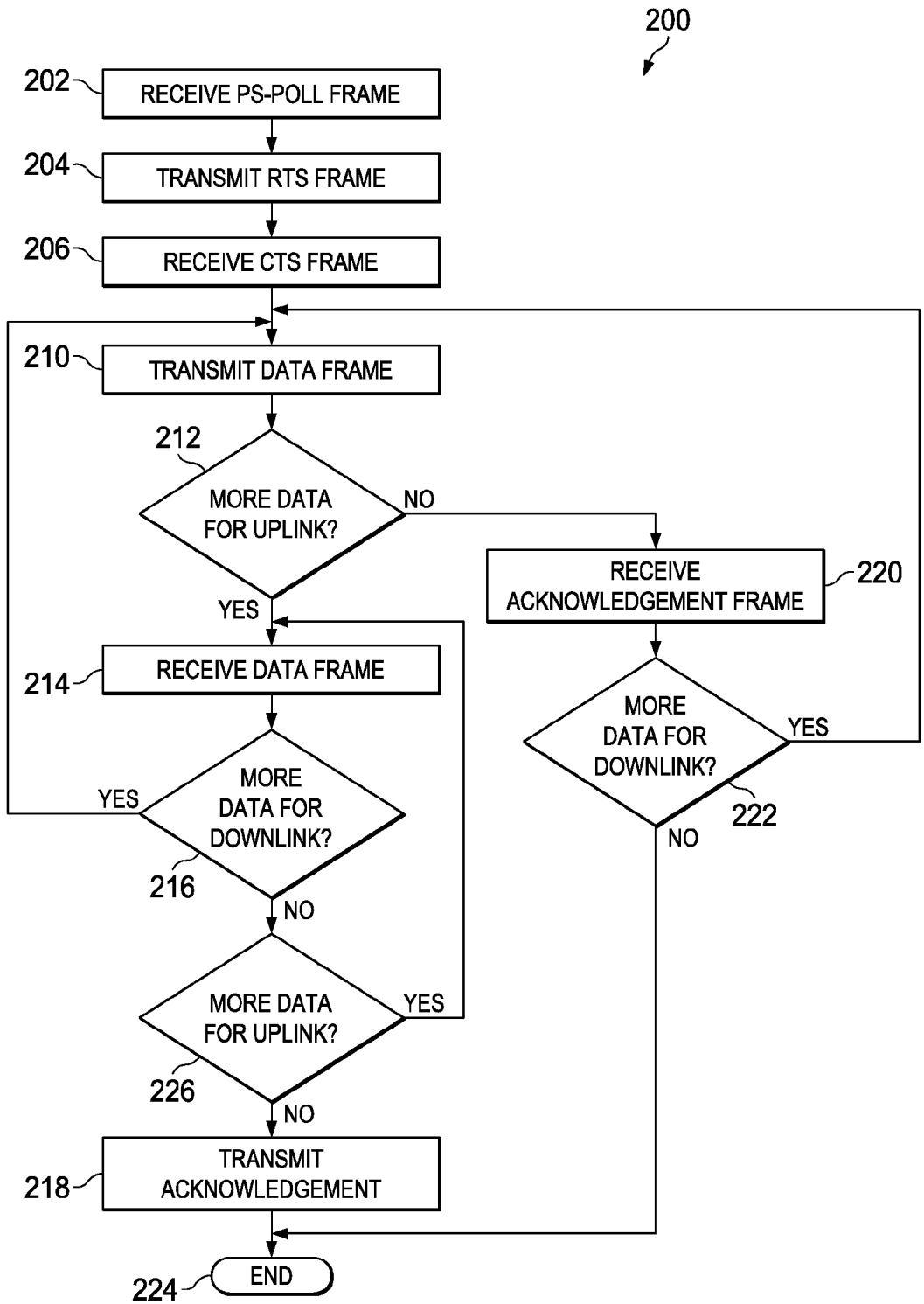
FIG. 13 illustrates a flowchart for another embodiment method of NAV settings for an SF exchange performed by a communications controller.

FIG. 13 illustrates flowchart 200 for a method of determining the duration of an SF exchange performed by a communications controller. Initially, in step 202, the communications controller receives a PS-Poll frame from a UE indicating that the UE is in an active state and initiating an SF exchange. The PS-Poll frame may be a regular PS-Poll frame or an NDP PS-Poll frame. In one example, when an NDP PS-Poll frame is used, the UDI field is set to a non-zero value to indicate that the UE has buffered data available for upload. Also, when an NDP PS-poll frame is used, there may be no MD field or response indication field. When a regular PS-Poll frame is used, the MD field may be set to either default or 1, indicating that the UE has more data for upload. Also, when a regular PS-Poll frame is used, there may be a duration field with a value of T4, where T4 indicates the duration of the uplink data transmission, including an uplink data frame, an acknowledgement frame (either regular or NDP), and the appropriate SIFS.

In response, after a SIFS, in step 204, the communications controller transmits an RTS frame to the UE, which may be a regular RTS frame or an NDP RTS frame. For both RTS frame types, the MD field may be the default and the duration field is equal to T1. In one example, T1 is the duration of a downlink transmission, including a downlink frame, a CTS frame (regular or NDP), an acknowledgement frame (regular or NDP), and SIFS. In another example, T1 is the duration of the SF exchange, including a CTS (regular or NDP), an uplink data frame, a downlink data frame, an acknowledgement frame (regular or NDP), and SIFS. T1 may be determined based on T4. The response indication field may be NDP or regular, depending on the type of CTS frame expected.

Next, in step 206, the communications controller receives a CTS frame from the UE, for example a SIFS after transmitting the RTS frame. The CTS frame may be a regular CTS frame or an NDP CTS frame. An NDP CTS frame may have no MD value and no response indication field. A regular CTS frame may have an MD value set to zero and a response indication field of long response. Both types of CTS frames may have a duration of T3, where T3 is the duration of the SF exchange, including an uplink data frame, a downlink data frame, an acknowledgment frame (regular or NDP) and appropriate SIFS.

Then, in step 210, the communications controller transmits a downlink data frame to the UE. The data frame has an MD frame indicating whether the communications controller has more data buffered for ready for downlink and a response indication field indicating the type of response the UE is expecting. For example, the response indication field may be a long response when a data frame is expected, a default when a regular acknowledgment is expects, and NDP when an NDP acknowledgment is expected.

Next, in step 212, the communications controller determines whether the UE has more buffered data for uplink, for example based on a PS-Poll frame, a duration field of a CTS or an MD value of 1 for a previous uplink data frame. When the communication controller determines that the UE has more buffered data ready for uplink, it proceeds to step 214 to receive an uplink data frame, and when there is no more buffered data ready for uplink, the communication controller proceeds to step 220 to receive an acknowledgement frame.

In step 214, the communications controller receives an uplink data frame from the UE, for example a SIFS after transmitting a data frame or an acknowledgment frame. The uplink data frame has a more data field indicating whether the UE has more data for uplink and a response indicator field indicating the response the UE expects.

Then, in step 216, the communications controller determines whether it has more buffered data ready for downlink. When there is more downlink data, the communications controller proceeds to step 210 to transmit another downlink data frame. When there is no more data for uplink, the communications controller proceeds to step 226.

In step 226, the communications controller determines whether the UE has more buffered data ready for uplink, for example based on an MD field of a previous uplink data frame or a duration field of a CTS frame. When there is more uplink data, the communications controller proceeds to step 214 to receive the next uplink data frame. When there is no more data ready for uplink, the communications controller proceeds to step 218.

In step 218, the communications controller transmits an acknowledgment frame to the UE, for example a SIFS after transmitting a data frame. The acknowledgment frame may be a regular acknowledgment frame or an NDP acknowledgment frame. There may be a more date indicator of 0 and a response indication field of no response. Then, the procedure ends in step 224.

In step 220, the communications controller receives an acknowledgment frame from the UE, for example a SIFS after transmitting a data frame. The acknowledgment frame may be a regular acknowledgment frame or an NDP acknowledgment frame, with a more data field of 0 and a response indicator field.

Next, in step 222, the communications controller determines whether it has more buffered data available for downlink. When the communications controller has more data for downlink, the communications controller proceeds to step 210 to transmit another data frame, and when the communications controller does not have more data for uplink, the communications controller proceeds to step 224 and ends the procedure.

Figure 14:
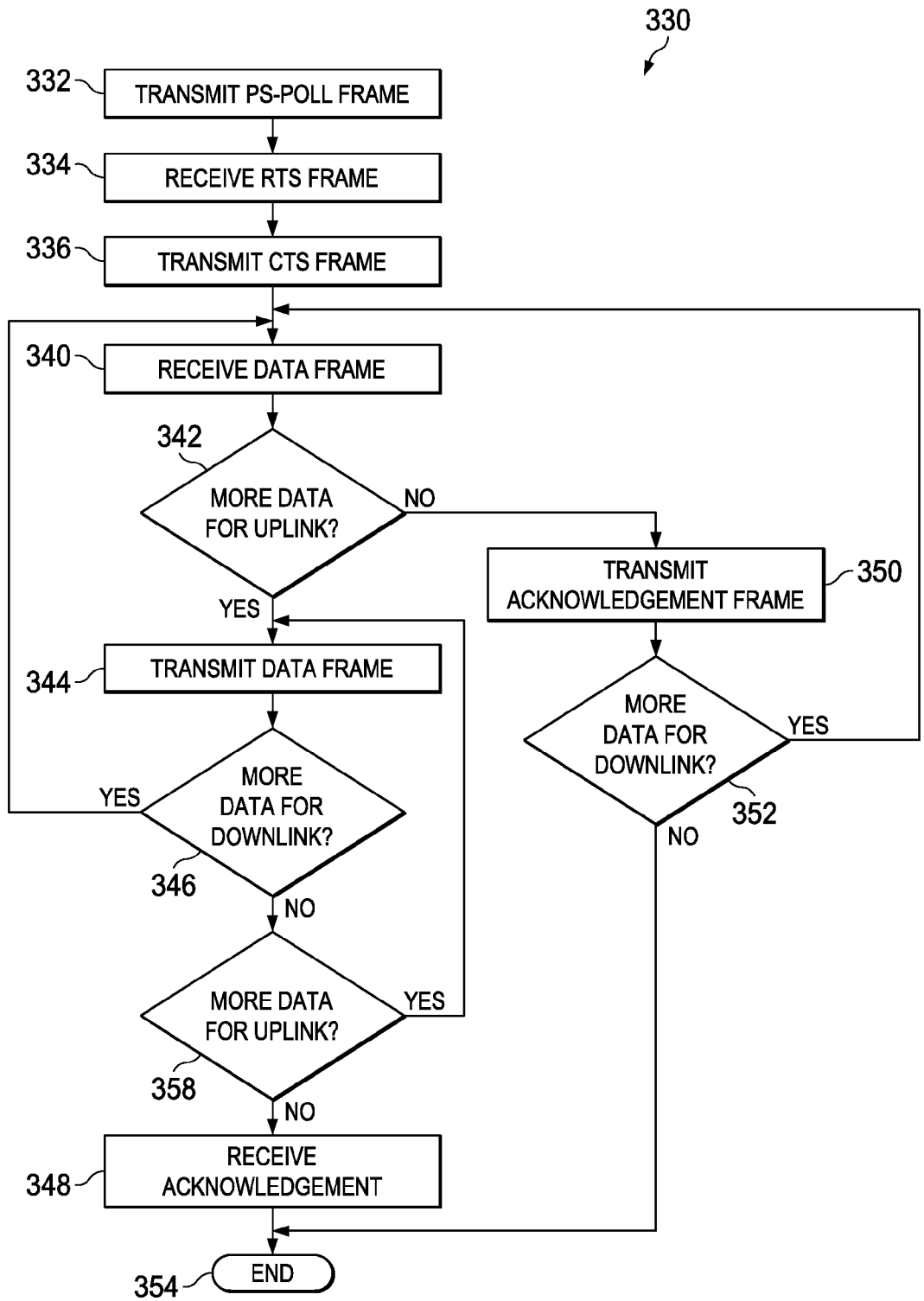
FIG. 14 illustrates a flowchart for another embodiment method of NAV settings for an SF exchange performed by a UE performing the SF exchange.

FIG. 14 illustrates flowchart 330 for a method of determining the duration of an SF exchange performed by a UE involved in the SF exchange. Initially, in step 332, the UE transmits a PS-Poll frame to a communications controller, indicating that the UE is active and prepared for data transmission. The PS-Poll frame may be either a regular PS-Poll frame or an NDP PS-Poll frame. In one example, the NDP PS-Poll frame has a UDI field set to a non-zero value, indicating that the UE has buffered data ready for upload, and no MD field or response indication frame. In another example, a regular PS-Poll frame has an MD field which may be set to either default or 1, where a value of 1 indicates that the UE has buffered data ready for uplink. In an additional example, where a regular PS-Poll frame is used, the duration field has a value of T4, where T4 is the duration of an uplink data transmission, including an uplink data frame, an acknowledgment frame, which may be a regular acknowledgment frame or an NDP acknowledgment frame, and appropriate SIFS.

Next, in step 334, the UE receives an RTS from the communications controller, for example a SIFS after transmitting the PS-Poll frame. An RTS frame may be a regular RTS frame or an NDP RTS frame. An NDP RTS frame has no MD field and a duration of T1. In one example, T1 is the duration of a downlink transmission, including a downlink frame, a CTS frame, which may be a regular CTS frame or an NDP CTS frame, an acknowledgment frame, which may be a regular acknowledgment frame or an NDP acknowledgment frame, with appropriate SIFS. In another example, T1 is the duration of the SF exchange, including a CTS frame, which may be a regular CTS frame or an NDP CTS frame, an uplink data frame, a downlink data frame, an acknowledgment frame, which may be a regular acknowledgment frame or an NDP acknowledgment frame, and appropriate SIFS. In this example, T1 may be determined based on T4. Also, the response indication field may be a regular response or an NDP, depending on the expected CTS type.

In response, in step 336, the UE transmits a CTS frame, either a regular CTS frame or an NDP CTS frame, to the communications controller and other UEs, for example a SIFS after receiving the RTS frame. A regular CTS frame may have an MD value set to zero and a response indication field set to long response, while an NDP CTS frame does not have an MD value or response indication field. Both types of CTS frames may have a duration of T3, where T3 is the duration of the SF exchange, including an uplink data frame, a downlink data frame, an acknowledgment frame, which may be a regular acknowledgment frame or an NDP acknowledgment frame, and appropriate SIFS. T3 may be determined based on T1.

Next, for example a SIFS after transmitting a CTS frame or a data frame, in step 340, the UE receives a downlink data frame from the communications controller, with an MD field indicating whether the communications controller has more buffered data ready for downlink, and a response indicating field indicating the type of response the communication controller expects.

Then, in step 342, the UE determines whether it has more buffered data ready for uplink. When the UE has more buffered data ready for uplink, it proceeds to step 344 to transmit a data frame, and when the UE does not have more buffered data ready for uplink, it proceeds to step 350 to transmit an acknowledgment frame.

In step 344, for example a SIFS after receiving a data frame, the UE transmits an uplink data frame which has an MD field indicating whether the UE has more data buffered for uplink and a response indication field indicating the response the UE expects.

Next, in step 346, the UE determines whether the communications controller has more data for downlink, for example based on an MD field of a previous downlink data frame. When the communications controller has more data for downlink, the UE proceeds to step 340 to receive another data frame. On the other hand, when the communications controller does not have more data for downlink, the UE proceeds to step 358.

In step 358, the UE determines whether there is more data for uplink. When there is more data for uplink, the UE proceeds to step 344, and when there is not more data for uplink, the UE proceeds to step 348.

In step 348, the UE receives an acknowledgment frame from the communication controller. The acknowledgment frame may be a regular acknowledgment frame or an NDP acknowledgment frame. The acknowledgment frame may have a more data field of 0 and a response indicator field. Then, the procedure ends in step 354.

In step 350, the UE transmits an acknowledgment frame, which may be a regular acknowledgment frame or an NDP acknowledgment frame. The acknowledgment frame may have a value of 0 in the MD field and a response indication field.

Next, in step 352, the UE determines whether the communications controller has more data for downlink, for example based on an MD field of a previous downlink data frame. When there is more data for downlink, the UE proceeds to step 340 to receive the next downlink data frame. When there is no more data for downlink, the UE proceeds to step 354 to end the procedure.

Figure 15:
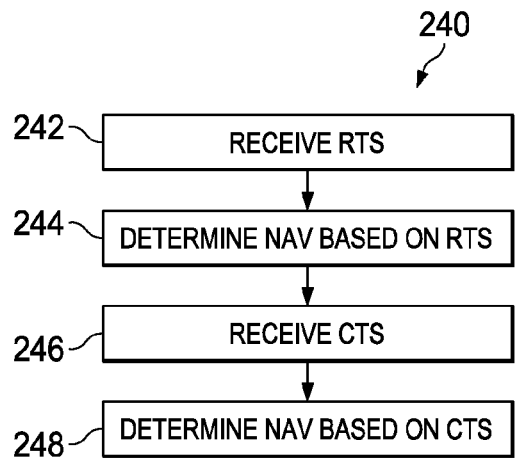
FIG. 15 illustrates a flowchart for an embodiment method of NAV settings for an SF exchange performed by a UE not performing the SF exchange.

In FIG. 15 illustrates flowchart 240 for a method of determining a duration of an SF exchange performed by a UE not involved in the SF exchange. Initially, in step 242, the UE receives an RTS frame. The RTS frame may be received from a communications controller or from another UE. The RTS frame may contain a MD field set to default, or it may not contain an MD field. The RTS frame has a response indication field set to the response the transmitting device is expecting, for example NDP or regular. Also, the RTS frame has a duration field T1.

Next, in step 244, the UE sets NAV (RTS) to the duration T1. In one example, duration T1 is the duration of one uplink or downlink data exchange, including a CTS frame (regular or NDP), an uplink data frame or a downlink data frame, and an acknowledgment frame (regular or NDP), with SIFS. In another example, T1 is the duration of an SF exchange, including a CTS frame (regular or NDP), a downlink data frame, an uplink data frame, and an acknowledgment frame (regular or NDP) with accompanying SIFS.

Then, in step 246, the UE receives a CTS frame, which may be a regular or NDP CTS frame. The CTS frame may be received from another UE or from a communications controller. When the RTS frame received in step 242 is from a communications controller, the CTS frame is from a UE, and when the RTS frame is from a UE, the CTS frame is from a communications controller. The CTS frame may contain a default response indication field, or no response indication field. Also, the CTS frame may contain a response indication field indicating the response the transmitting device expects, for example default, or no response indication field. Also, the CTS frame has a duration field of T3.

Finally, in step 248, the UE sets NAV (CTS) based on the duration field T3. The UE calculates T1−T2, where T2 is the time difference between receiving the CTS frame and receiving the RTS frame. For a single data frame, the UE would expect T3 to equal T1−T2. In one example, T3 is greater than T1−T2, and is equal to the length of an SF exchange, and the UE may determine that an SF exchange is in progress, and sets NAV (CTS) to T3. In another example, T3 is equal to T1−T2, and T1 is already equal to the duration of the SF exchange, so the end of NAV (RTS) is equal to the end of NAV (CTS).

Figure 16:
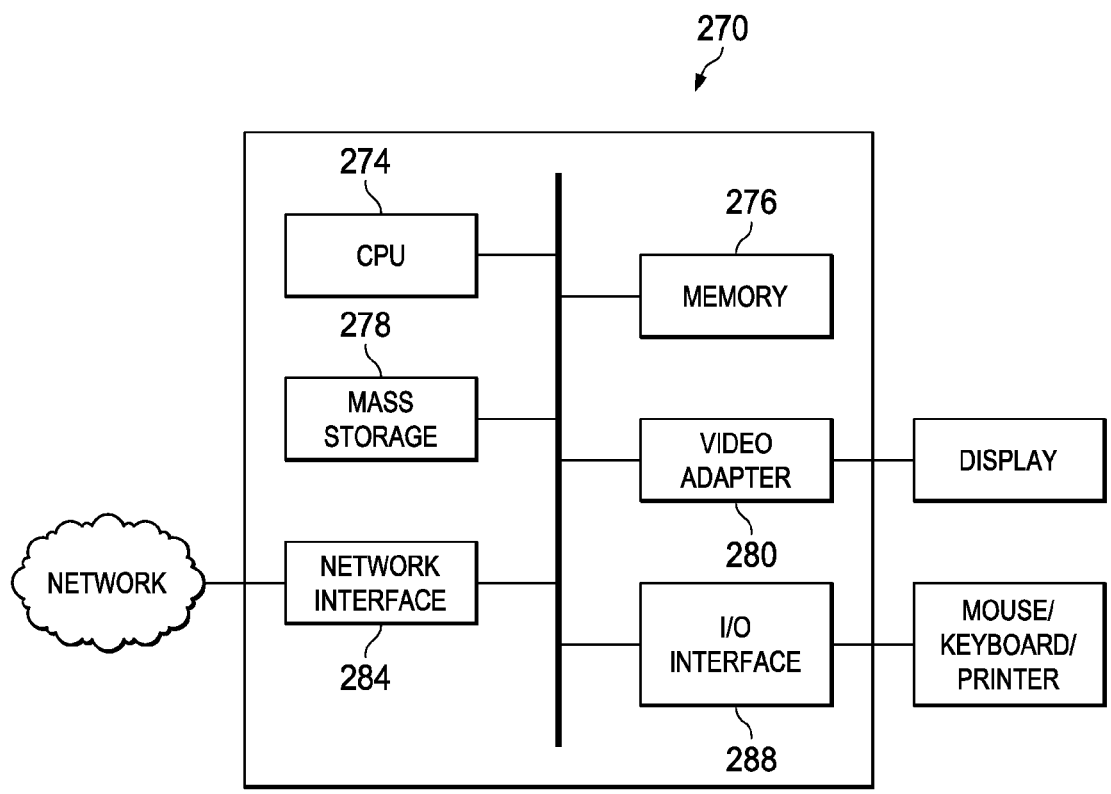
FIG. 16 illustrates a block diagram of an embodiment computer system.

FIG. 16 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adaptor 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving, at a first time, by a first user equipment (UE) from a first device, a request to send (RTS) frame comprising a first duration;
   receiving, at a second time, by the first UE from a second device, a clear to send (CTS) frame comprising a duration of a speed frame (SF) exchange;
   determining a difference between the first duration and a time difference between the second time and the first time;
   determining a comparison between the difference and the duration of the SF exchange; and determining that the SF exchange is in progress based on the comparison, wherein the comparison indicates that the difference is less than the duration of the SF exchange.

2. The method of claim 1, further comprising setting a network allocation vector (NAV) RTS to the first duration.

3. The method of claim 2, wherein determining the duration of the SF exchange comprises:
setting a NAV CTS to the duration of the SF exchange.

4. The method of claim 1, further comprising waiting until the duration expires to interact with the first device and the second device.

5. A method comprising:
receiving, by a communications controller from a user equipment (UE), a power save (PS)-Poll frame comprising a more data (MD) field and a duration of uplink data transmission;
determining that the MD field of the PS-Poll frame is 1;
setting, by the communications controller, a first duration in accordance with the duration of the uplink data transmission in the PS-Poll frame, in response to determining that the MD field is 1, wherein the first duration indicates a duration of a speed frame (SF) exchange;
transmitting, at a first time, by the communications controller to the UE, a request to send (RTS) frame comprising the first duration;
receiving, at a second time, by the communications controller from the UE, after transmitting the RTS frame, a clear to send (CTS) frame comprising a second duration, wherein the second duration is the duration of the SF exchange;
transmitting, by the communications controller to the UE, after receiving the CTS frame, a first data frame; and
receiving, by the communications controller from the UE, after transmitting the first data frame, a second data frame.

6. The method of claim 5, further comprising transmitting, by the communications controller to the UE, an acknowledgment frame.

7. The method of claim 5, wherein receiving the CTS frame occurs a short interframe spacing (SIFS) after transmitting the RTS frame, transmitting the first data frame occurs the SIFS after receiving the CTS frame, and receiving the second data frame occurs the SIFS after transmitting the first data frame.

8. The method of claim 5, further comprising:
determining a difference between the second time and the first time to produce a third duration; and
determining a difference between the first duration and the third duration to produce a fourth duration, wherein a difference between the fourth duration and the second duration indicates the SF exchange.

9. The method of claim 5, wherein setting the first duration comprises setting the first duration to the sum of the duration of the uplink data transmission in the PS-Poll frame, a duration of downlink data transmission, a duration of the CTS frame, and inter-frame spacings, in response to determining that the MD field is 1.

10. The method of claim 5, wherein the PS-Poll frame indicates the SF exchange.

11. The method of claim 5, wherein the PS-Poll frame comprises an uplink data indication (UDI) field, wherein the UDI field of the PS-Poll frame indicates the SF exchange.

12. The method of claim 5, wherein the PS-Poll frame comprises a response indication field, wherein the response indication field of the PS-Poll frame indicates the SF exchange.

13. The method of claim 5, wherein the PS-Poll frame comprises a more data field, wherein the more data field of the PS-Poll frame indicates the SF exchange.

14. The method of claim 5, wherein the first duration indicates the SF exchange.

15. The method of claim 5, further comprising transmitting, by the communications controller to the UE, an acknowledgment frame after receiving the second data frame.

16. A method comprising:
receiving, at a first time, by a first device from a second device, a request to send (RTS) frame comprising a first duration;
determining a difference between the first duration and a time difference between a second time and the first time;
setting a duration of a speed frame (SF) exchange to a sum of the difference and a time for transmission by the second device;
transmitting, at the second time, by the first device to the second device, after receiving the RTS frame, a clear to send (CTS) frame comprising the duration of the SF exchange, and wherein the duration of the SF exchange indicates initiation of the SF exchange;
receiving, by the first device from the second device, after transmitting the CTS frame, a first data frame; and
transmitting, by the first device to the second device, after receiving the first data frame, a second data frame.

17. The method of claim 16, further comprising transmitting, by the first device to the second device, a power save (PS)-Poll frame before receiving the RTS frame.

18. The method of claim 17, wherein the PS-Poll frame indicates the SF exchange.

19. The method of claim 16, wherein the first duration indicates the SF exchange.

20. The method of claim 16, wherein the CTS frame is a null data packet (NDP) CTS frame.

21. A user equipment (UE) comprising:
a processor; and
a non-transitory computer readable storage medium storing programming for execution by the processor, the programming including instructions to
receive, at a first time, from a first device, a request to send (RTS) frame comprising a first duration,
receive, at a second time, from a second device, a clear to send (CTS) frame comprising a duration of a speed frame (SF) exchange,
determine a difference between the first duration and a time difference between the second time and the first time
determine a comparison between the difference and the duration of the SF exchange, and
determine that the SF exchange is in progress based on the comparison, wherein the comparison indicates that the difference is less than the duration of the SF exchange.

* * * * *